US007638959B2

United States Patent
Rozman et al.

(10) Patent No.: US 7,638,959 B2
(45) Date of Patent: Dec. 29, 2009

(54) METHOD OF OPERATING A BRUSHLESS MOTOR WHEREIN OPEN LOOP AND CLOSED LOOP CONTROLLERS UTILIZE DIFFERENT COMMUTATION METHODS

(75) Inventors: Gregory I. Rozman, Rockford, IL (US); Matthew L. Wilhide, Cherry Valley, IL (US); Vijay K. Maddali, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 264 days.

(21) Appl. No.: 11/956,399

(22) Filed: Dec. 14, 2007

(65) Prior Publication Data

US 2009/0153083 A1 Jun. 18, 2009

(51) Int. Cl.
*H02P 6/08* (2006.01)
*H02P 6/06* (2006.01)
*H02P 1/04* (2006.01)

(52) U.S. Cl. ............... 318/400.09; 318/400.11; 318/696; 388/800; 388/825; 701/93; 701/110

(58) Field of Classification Search ........... 318/400.09, 318/400.11, 696, 685; 388/800, 825, 842, 388/848; 701/93, 110
See application file for complete search history.

(56) References Cited

U.S. PATENT DOCUMENTS

| 5,006,768 | A | 4/1991 | Rozman |
| 5,006,774 | A | 4/1991 | Rees |
| 5,029,265 | A | 7/1991 | Staats |
| 5,747,971 | A | 5/1998 | Rozman |
| 5,774,820 | A * | 6/1998 | Linden et al. ............. 701/93 |
| 5,783,920 | A | 7/1998 | Hahn |
| 5,821,724 | A | 10/1998 | Hinton |
| 6,622,071 | B2 | 9/2003 | Reuter |
| 6,734,649 | B1 | 5/2004 | Sardar |
| 6,891,346 | B2 | 5/2005 | Simmons |
| 7,049,281 | B2 | 5/2006 | Mondin |

FOREIGN PATENT DOCUMENTS

| EP | 0991179 | 4/2000 |
| JP | 62260583 | 11/1987 |
| WO | 2008052714 | 5/2008 |

OTHER PUBLICATIONS

Search Report mailed Apr. 2, 2009.

* cited by examiner

*Primary Examiner*—Paul Ip
(74) *Attorney, Agent, or Firm*—Carlson, Gaskey & Olds (57) ABSTRACT

A motor control is provided with both open loop and closed loop controllers. The open loop and closed loop controllers provide commutation signals back to gate drives for an inverter, wherein the commutation signals utilize sinusoidal signals in open loop control, and utilize six step commutation in closed loop control.

18 Claims, 8 Drawing Sheets

FIG.8

METHOD OF OPERATING A BRUSHLESS MOTOR WHEREIN OPEN LOOP AND CLOSED LOOP CONTROLLERS UTILIZE DIFFERENT COMMUTATION METHODS

BACKGROUND OF THE INVENTION

This application relates to a method of operating a brushless DC motor, wherein an open loop control is used at low speed, and utilizes sinusoidal commutation, and a closed loop control is utilized at higher speeds and utilizes six step commutation.

Motor controls are becoming quite complex. In particular, sensorless controls for electric motors must commutate the motor windings using a three-phase variable voltage variable frequency power supply. Complex feedback of speed and position as well as current is provided to ensure that the motor is operating as desired.

Typically, at lower speeds, an open loop controller is utilized. At higher speeds, the control switches to closed loop control. It is typical in the prior art that each of these controls communicate through a mode selector switch, and that each provides six step or 120° commutation.

However, at lower speeds, it is difficult to sense the back emf phenomenon, which is utilized to provide much of the feedback. For this reason, the open loop control is used at low speed, however, the open loop control is sensitive to the torque fluctuations which may sometimes cause the control to misidentify the actual position or speed of the motor.

SUMMARY OF THE INVENTION

In the disclosed embodiment of this invention, an open loop control is utilized at lower speed, and the system switches to a closed loop control at higher speeds. The open loop control is provided with sinusoidal commutation, while the closed loop control utilizes six step commutation. In another feature, a mode selective switch which switches between open and loop control has an intermediate ground position which allows the control to adjust between the two loop control modes.

These and other features of the present invention can be best understood from the following specification and drawings, the following of which is a brief description.

DETAILED DESCRIPTION OF THE PREFERRED EMBODIMENT

Figure 1:
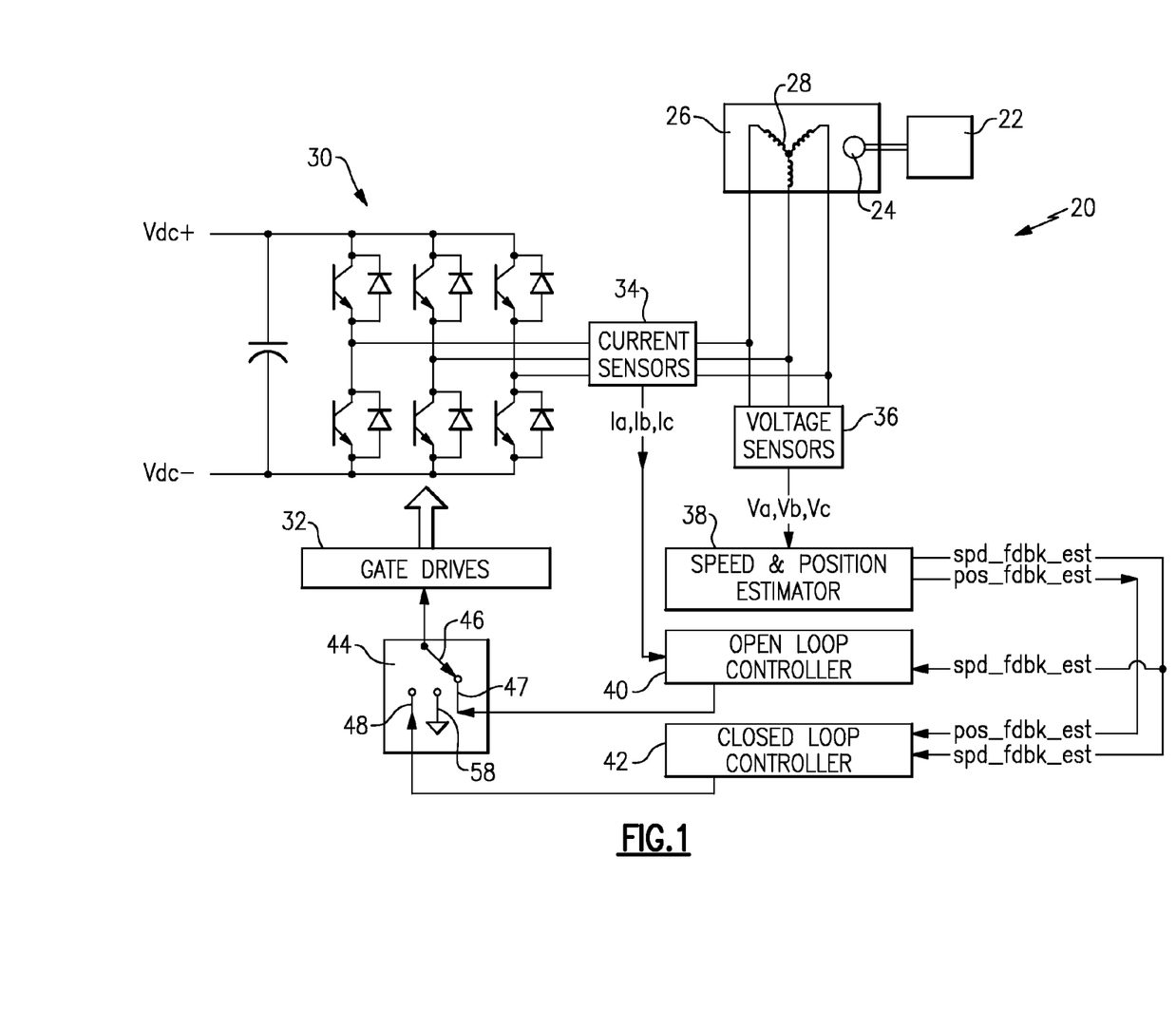
FIG. 1 is a schematic view of a first motor controller.

A motor and control circuit 20 is illustrated in FIG. 1 for controlling an electric motor 26. As known, a rotor 24 is driven by a stator having a plurality of armature windings 28. An inverter 30 switches the phase among the windings between the three-phase of power being supplied. Gate drivers 32 control the six switches which are part of the inverter 30. This is generally as known in the prior art. Current sensors 34 supply current signals to an open loop control 40.

Voltage sensors 36 supply voltage signals from each of the three-phases through to a speed and position estimator 38. The speed and position estimator 38 provides a speed feedback signal to the open loop controller 40, and a position and a speed feedback signal to the closed loop controller 42. Each of the controllers 40 and 42 communicate with a mode selector switch 44. A switch member 46 switches between an open loop position and a closed loop position 48. There is also an intermediate ground position 50, as shown.

Figure 2:
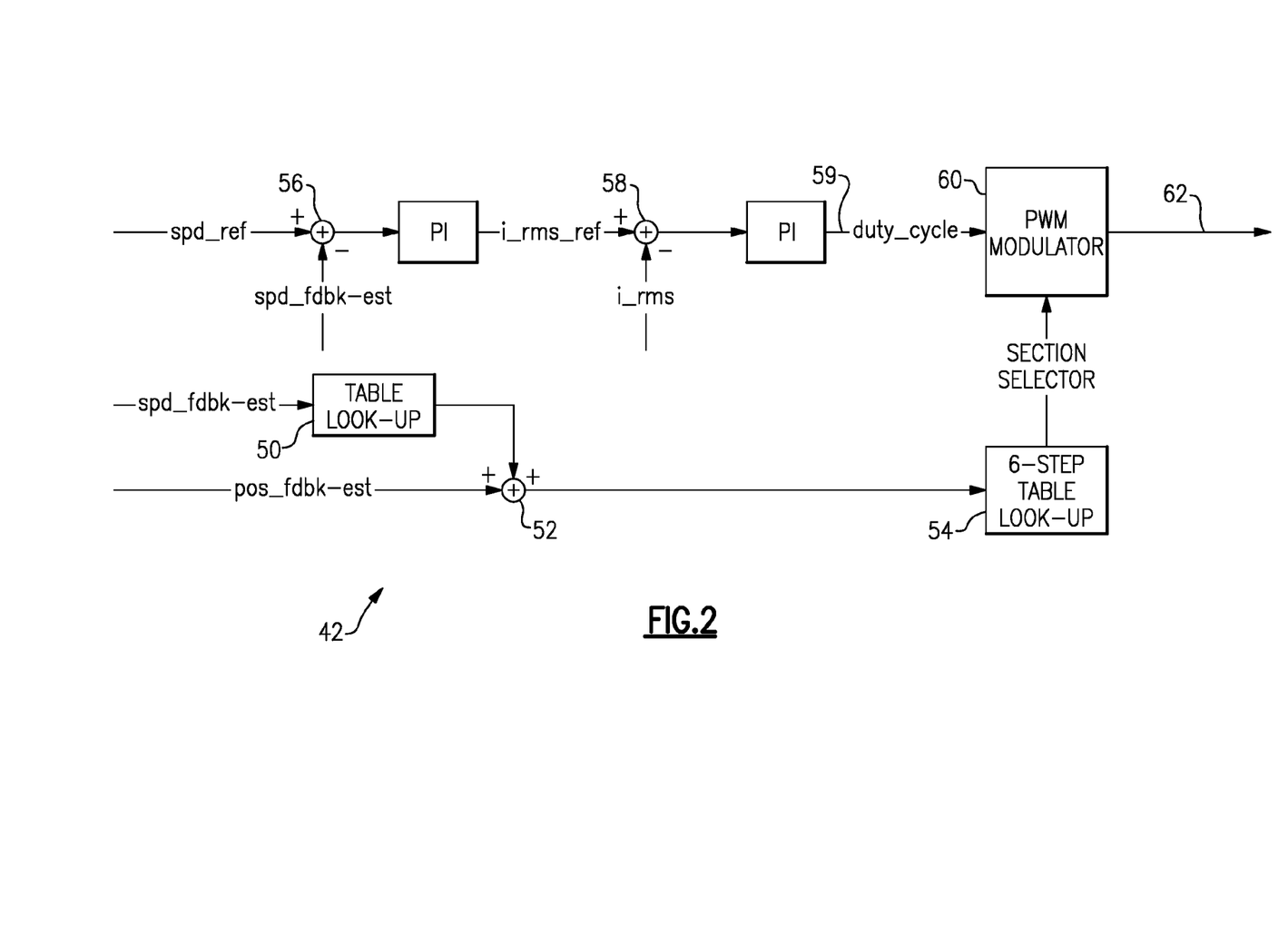
FIG. 2 schematically shows a closed loop controller for the FIG. 1 system.

The closed loop controller 42 is described further in FIG. 2. As shown, a speed reference and the speed feedback signal are compared at comparator 56. The output extends via a proportional-integral (PI) control block to another comparator 58 which also takes in the signal i_rms signal from calculator 82 (see FIG. 3). The signal from comparator 58 provides a duty cycle signal to a PWM modulator 60.

A speed feedback signal is also provided to a lookup table 50. The lookup table provides an offset variable. As the speed increases, the amount of this offset will increase also. This offset is provided to a summer 52 which also takes in a position feedback signal. This output is sent to a six step lookup table 54, which provides a section selector signal to the pulse width modulator 60. The six step lookup table shows which phase should be conductive at any one moment given the expected position. The output of the pulse width modulator 60 extends to the mold selector switch through a line 62. The close loop controller operates much as is known in the prior art.

Figure 3:
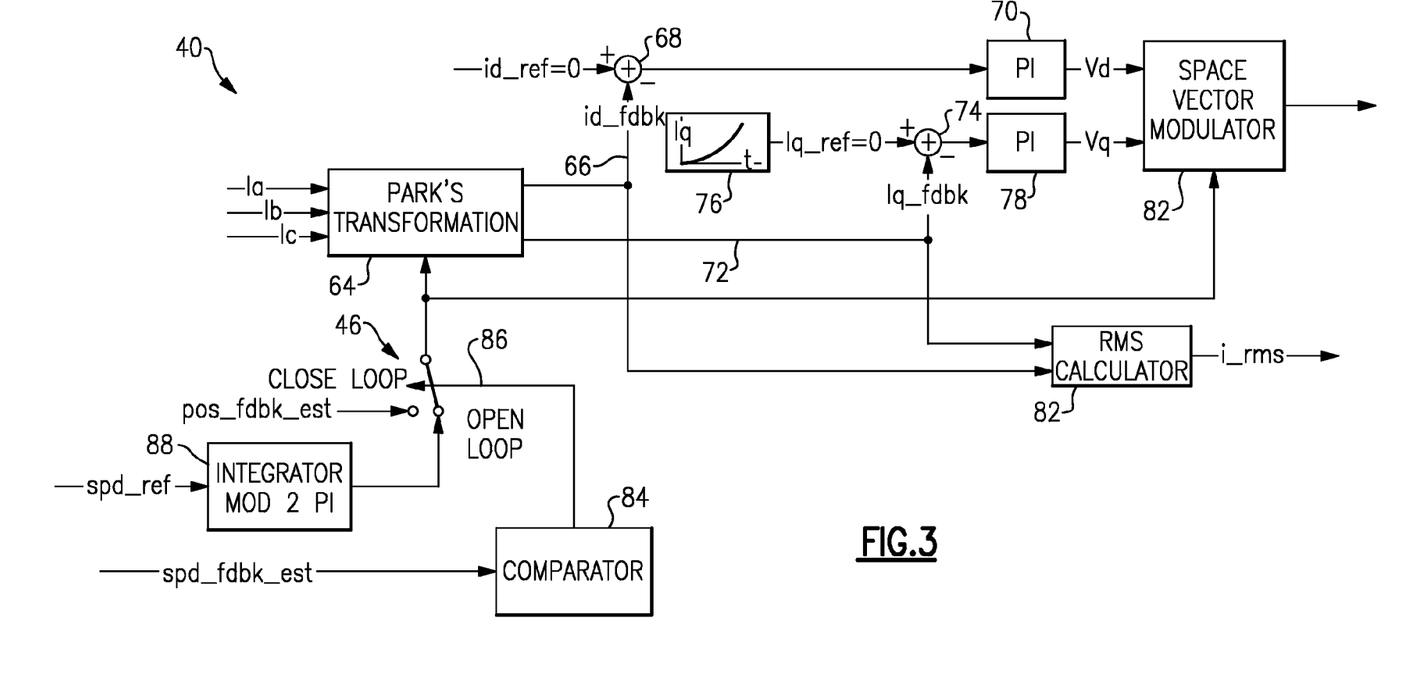
FIG. 3 schematically shows an open loop controller for the FIG. 1 system.

FIG. 3 shows an open loop controller 40. A Park's transformation 64 takes in the current signals and transforms them into an $I_d$ and an $I_q$ component. An $I_d$ component is sent to a comparator 68, where it is compared to a reference signal. The output of comparator 68 goes to a PI component 70 which provides a $V_d$ signal to a space vector modulator 80. The Park's transformation 64 also provides a $I_q$ feedback signal at line 72 to a comparator 74 and to an RMS calculator 82. The $I_d$ feedback signal is also sent to the RMS calculator 82, and the i_rms signal which is supplied to the closed loop controller.

As can be seen, the comparator 74 compares the $I_q$ feedback to an $I_q$ reference which increases along a parabolic curve as shown in 76. In this manner, the $I_q$ component, which is essentially a torque component, ramps upwardly after startup. This reduces the challenges on the motor when getting up to speed.

Figure 4:
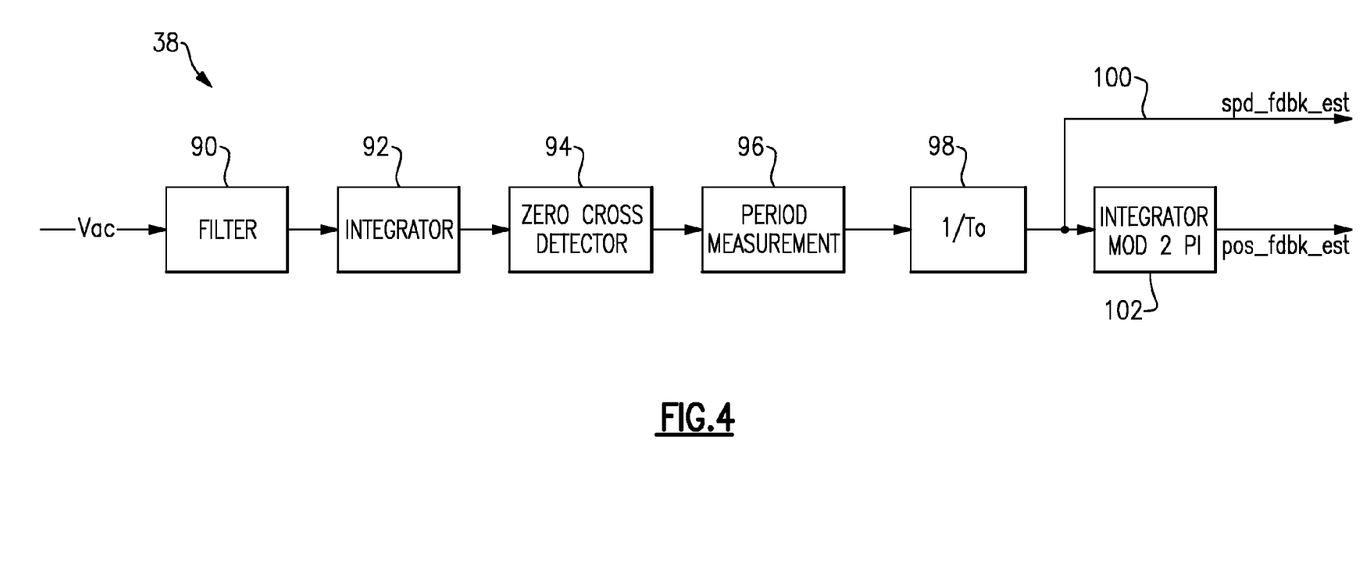
FIG. 4 shows a speed and position estimator for the FIG. 1 system.

A comparator 84 also takes a speed feedback signal, and supplies a signal 86 which switches the mode selector switch 46 between the open and closed positions dependent on whether the speed has passed beyond a predetermined level. An integrator 88 takes in the speed reference signal and supplies it through the switch 46, when in open loop control. The speed and position estimator 38 is shown in FIG. 4. As shown, the voltage signals pass into a filter 90, through an integrator 92, a zero cross detector 94, which outputs rectangular pulses to a period measurement 96. That period is divided into one at 98, and the output 100 is supplied as a speed feedback estimate, while an integrator integrates the signal at 102 to provide a position feedback estimate.

Now, the present invention, improves upon the prior art in that the open loop controller has a space vector modulator at 80 output is a sinusoidal signal to the mode selector. The sinusoidal signal will be more reliable at lower speeds, and thus will overcome the prior art problems with torque fluctuation. Once the system switches to close loop control, it goes back to six step commutation.

Another feature of the present invention is that, after having moved to closed loop control, if the speed does not pass a predetermined level within a period of time, then the switch 46 is driven back to open loop control to start over. Another feature is that the switch 46 stops on a ground position 50 for a few milliseconds in between the open and close loop controls. This can prevent a loss of synchronization that may otherwise occur with an abrupt switch between the two control modes.

Figure 5:
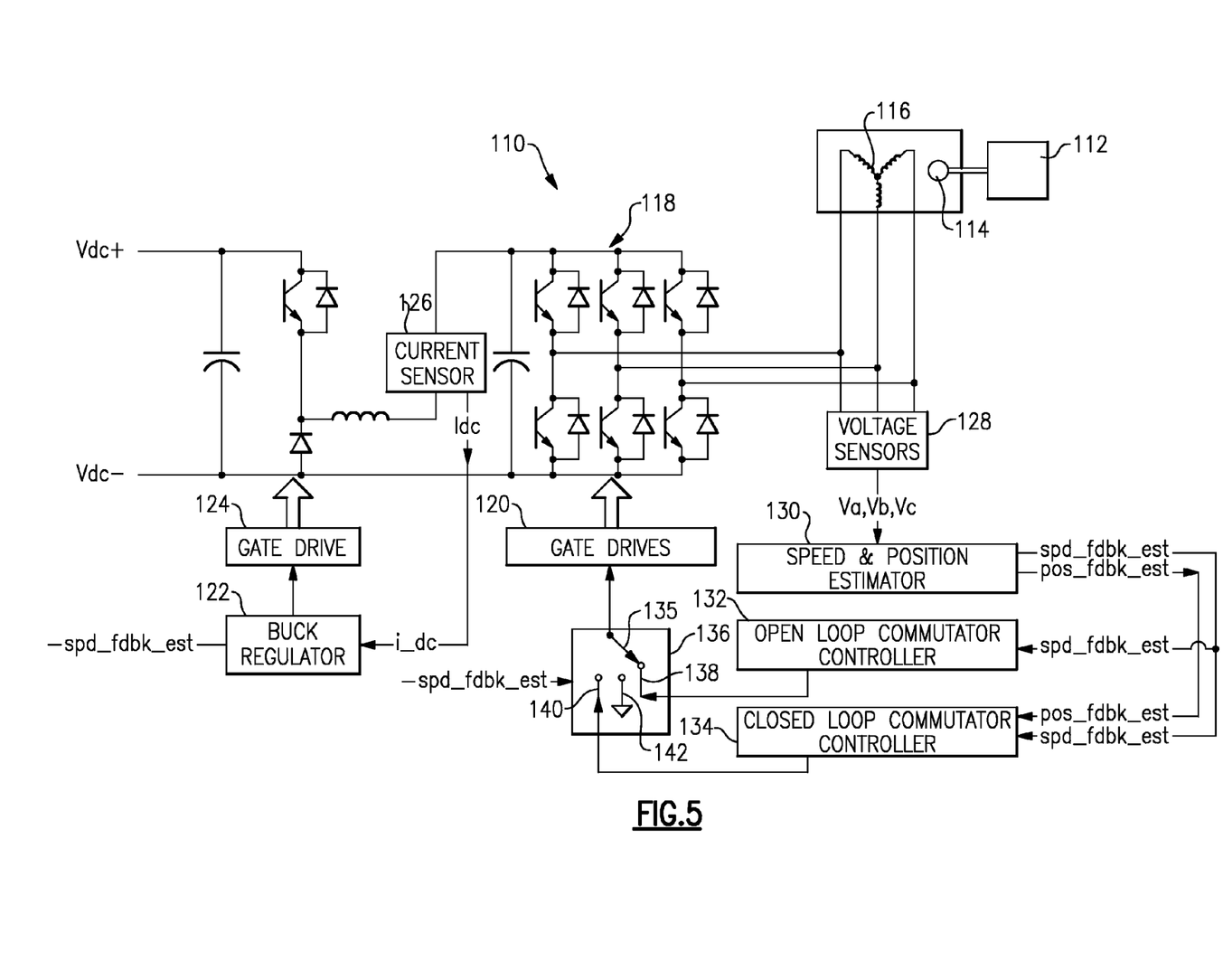
FIG. 5 shows a second schematic circuit.

FIG. 5 shows another circuit 110 which may be provided for a pump motor controller for a pump motor 112. Again, a rotor 114 is driven by armature windings 116. Here, the inverter 118 is provided by switches driven by gate drives 120 as in FIG. 1. However, a buck regulator 122 controls a gate drive 124 to control the current supply. A current sensor 126 also supplies a signal back to the buck regulator 122. In this circuit, the voltage sensors 128 still communicate with a speed and position estimator 130, which may be essentially identical to the FIG. 4 circuit. Further, the output of the speed estimator is provided to an open loop controller 132, and the output of the speed and position estimator is provided to a closed loop controller 134. Each of these signals is provided to a mode selector switch 136 having a moving switch member 135 moving between an open loop position 138 and a closed loop position 140, and again having an intermediate ground position 142.

Figure 6:
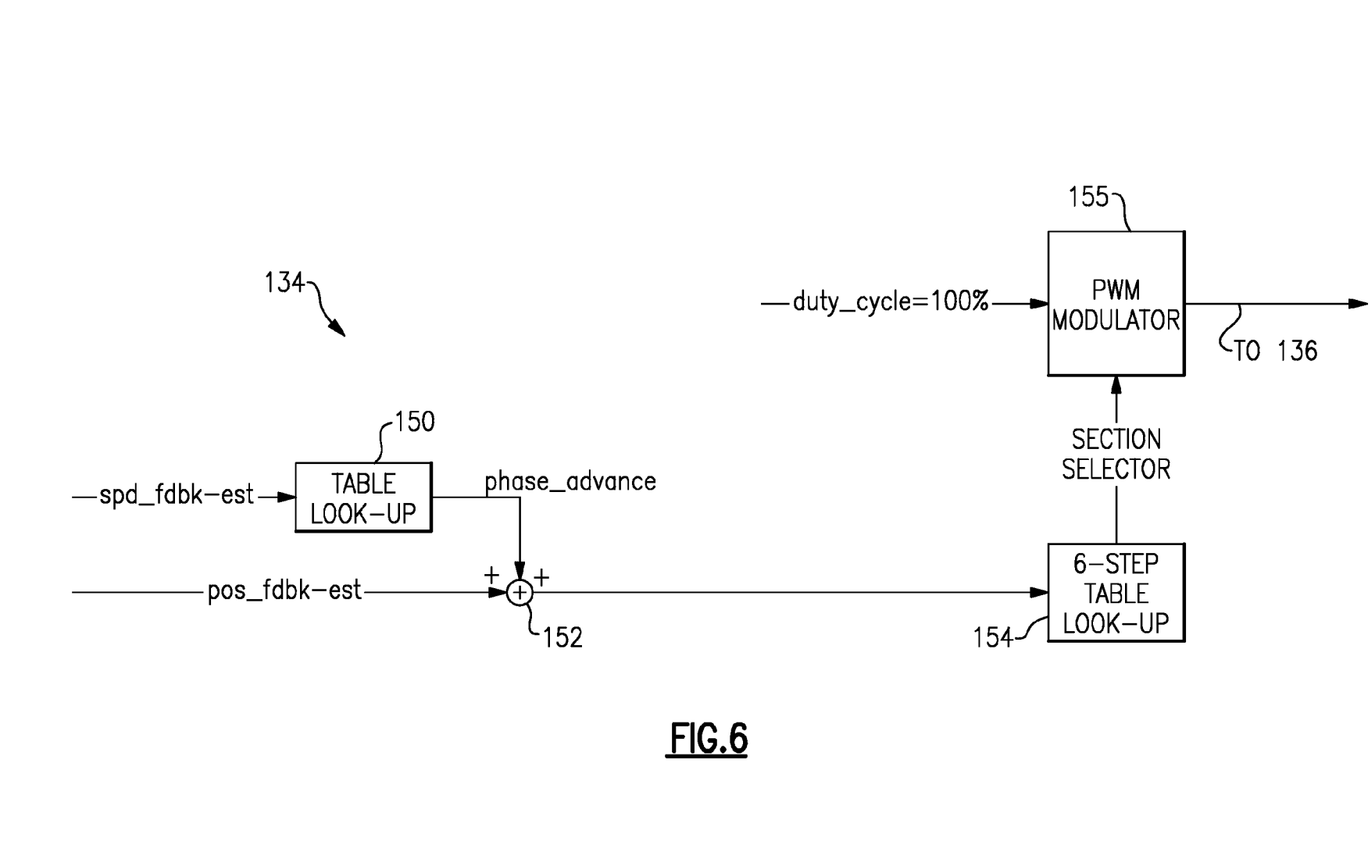
FIG. 6 shows the closed loop controller for the FIG. 5 circuit.

The closed loop controller for the FIG. 5 embodiment is illustrated in FIG. 6. As shown, a lookup table 150 provides a phase advance signal based upon a sensed speed feedback to a summer 152. If the position feedback estimate is taken with this phase advance and supplied to a six step lookup table 154. In this embodiment the duty cycle is assumed to be 100% as is supplied to the pulse width modulator 155. The output goes to the mode selector switch 136, and to the gate drives. Here, the six step commutation is utilized for the closed loop control as in the first embodiment.

Figure 7:
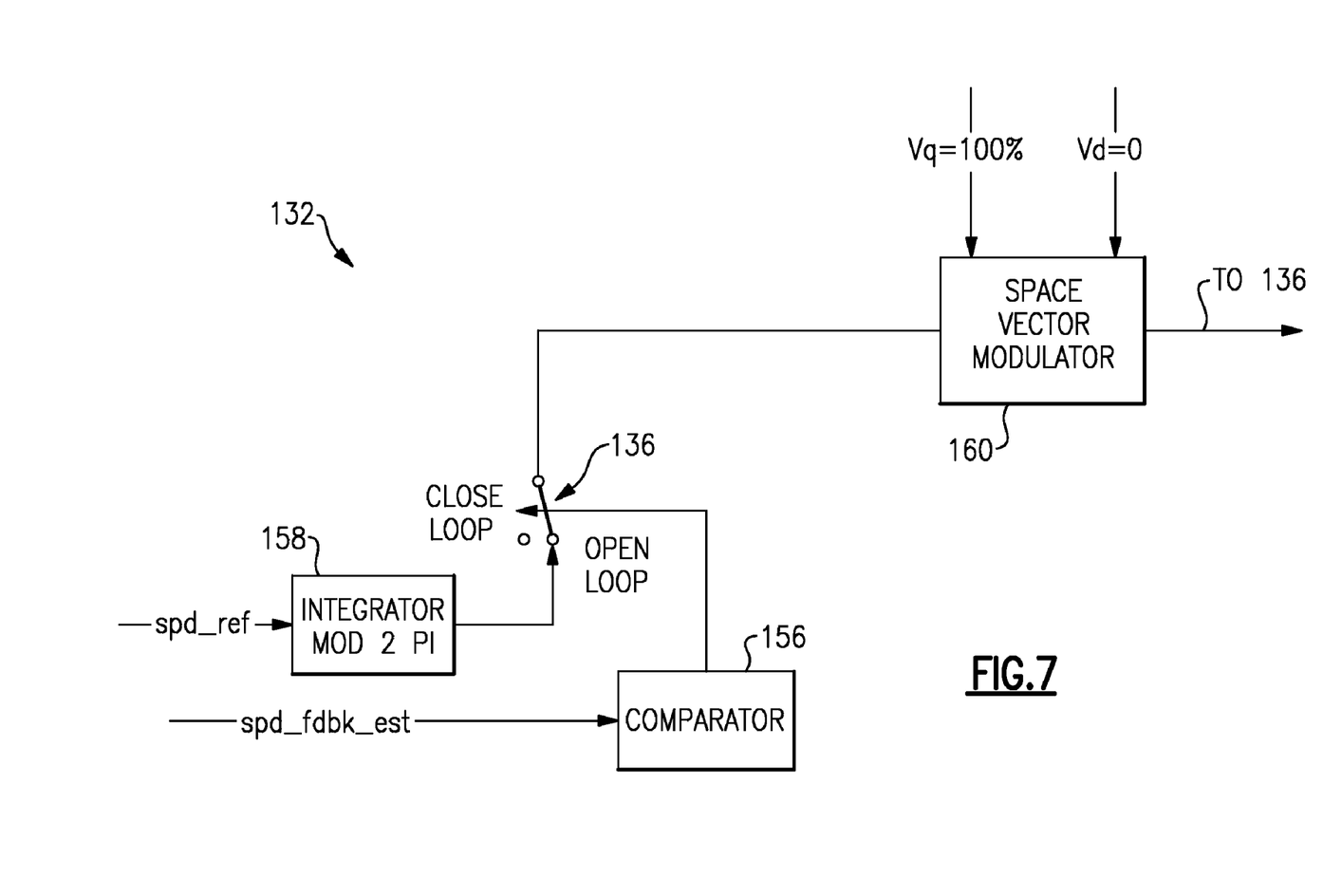
FIG. 7 shows the open loop controller for the FIG. 5 circuit.

FIG. 7 shows an open loop control 132 for this embodiment. An integrator 158 sends its signal through a switch 136 when in open loop control. A comparator 156 switches the switch 136 as in the first embodiment. Here, the space vector modulator 160 supplies the signal to the switch 136 to again be sinusoidal. Thus, the benefits as mentioned with regard to the first embodiment are achieved.

Figure 8:
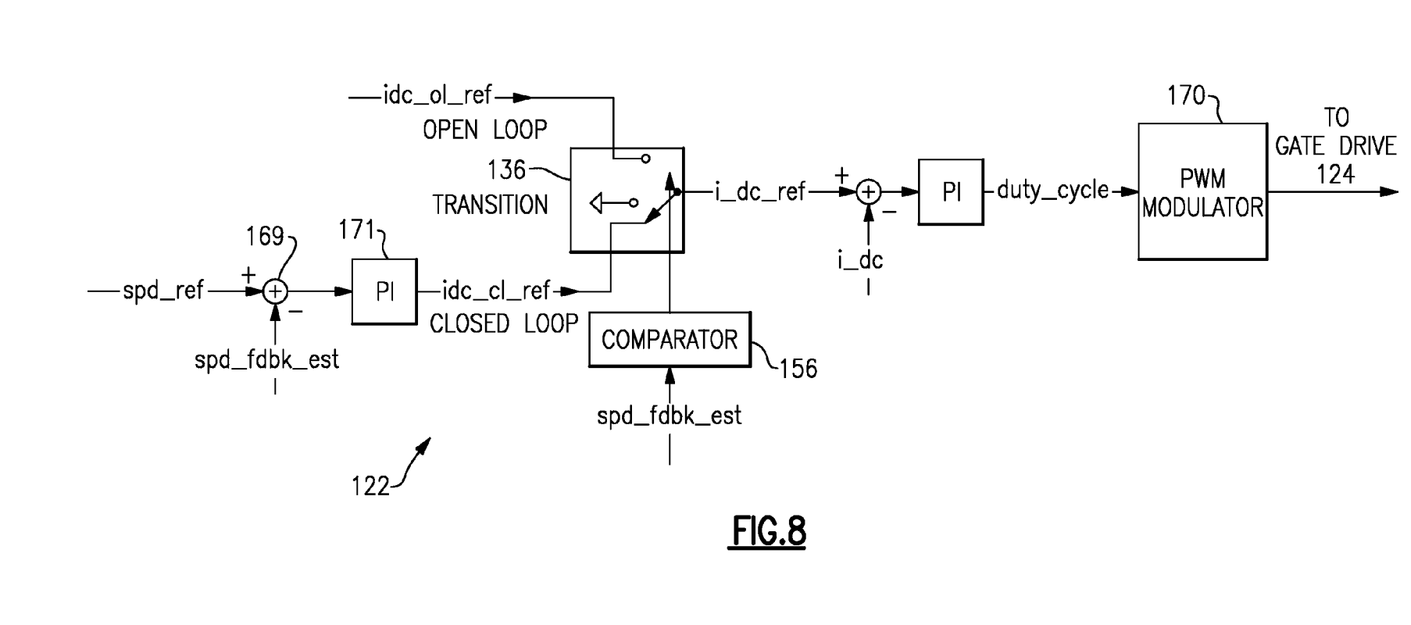
FIG. 8 shows a buck regulator which is incorporated into the FIG. 5 circuit.

FIG. 8 shows a buck regulator 122 for this embodiment. As shown, a comparator 169 compares a speed reference and a speed feedback signal, and sends that signal to a PI box 171. This signal passes through a switch 136. A comparator 156 compares the speed feedback estimate, and supplies a signal downstream to control the switch 136. A signal passes through the comparator, PI block and the pulse width modulator 170, and back to the buck regulator.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A motor controller comprising:
   An inverter delivering a variable voltage variable frequency three-phase power to armature windings for driving the rotor of an electric motor; and
   voltage sensors for supplying a voltage signal to a speed and position estimator, and there being an open loop controller and a closed loop controller, with each of said open and closed loop controllers communicating to gate drives for said inverter, and said open loop controller controlling said gate drives with sinusoidal commutation, and said closed loop controller controlling said gate drives with six step commutation.

2. The motor controller as set forth in claim 1, wherein said open loop controller receives a speed feedback signal and a position feedback signal from said speed and position estimator, and said closed loop controller receives position and speed feedback estimates.

3. The motor controller as set forth in claim 2, wherein said open loop controller also receives signals from current sensors downstream of said inverter.

4. The motor controller as set forth in claim 1, wherein a mode selector switch switches between an open loop control position and a closed loop control position based upon a motor speed exceeding a predetermined level.

5. The motor controller as set forth in claim 4, wherein an intermediate ground position is provided on said mode selector switch, and said mode selector switch sits in said intermediate ground position between said open loop position and being said closed loop position.

6. The motor controller as set forth in claim 4, wherein said mode selector switch continues to monitor speed after having been moved to said closed loop position, and if said speed does not increase as expected after a predetermined period of time will move said switch back to said open loop position.

7. The motor controller as set forth in claim 1, wherein said open loop controller takes in an $I_q$ feedback quantity and compares it to an $I_q$ reference quantity to determine an error signal, and wherein said $I_q$ reference quantity is determined along a curve based upon the amount of time that said motor has been operating.

8. The motor controller as set forth in claim 7, wherein said curve is a parabolic curve.

9. A motor and controller comprising:
   a rotor;
   a control and an inverter delivering a variable voltage variable frequency three-phase power to windings for driving said rotor; and
   voltage sensors for supplying a voltage signal to a speed and position estimator, and there being an open loop controller and a closed loop controller, with each of said open and closed loop controllers communicating to gate drives for said inverter, and said open loop controller controlling said gate drives with sinusoidal commutation, and said closed loop controller controlling said gate drives with six step commutation.

10. The motor and controller as set forth in claim 9, wherein said open loop controller receives a speed feedback signal from said speed and position estimator, and said closed loop controller receives position and speed feedback estimates.

11. The motor and controller as set forth in claim 10, wherein said open loop controller also receives signals from current sensors downstream of said inverter.

12. The motor and controller as set forth in claim 9, wherein a mode selector switch switches between an open loop control position and a closed loop control position based upon a motor speed exceeding a predetermined level.

13. The motor and controller as set forth in claim 12, wherein an intermediate ground position is provided on said mode selector switch, and said mode selector switch sits in said intermediate ground position between said open loop position and being said closed loop position.

14. The motor and controller as set forth in claim 12, wherein said mode selector switch continues to monitor speed after having been moved to said closed loop position, and if said speed does not increase as expected after a predetermined period of time will move said switch back to said open loop position.

15. The motor and controller as set forth in claim 9, wherein said open loop controller takes in an $I_q$ feedback quantity and compares it to an $I_q$ reference quantity to determine an error signal, and wherein said $I_q$ reference quantity is determined along a curve based upon the amount of time that said motor has been operating.

16. The motor and controller as set forth in claim 15, wherein said curve is a parabolic curve.

17. The motor and controller as set forth in claim 9, wherein said rotor drives a pump.

18. A motor controller comprising:

An inverter delivering variable voltage variable frequency three-phase power to armature windings for driving the rotor of an electric motor;

voltage sensors for supplying a voltage signal to a speed and position estimator, and there being an open loop controller and a closed loop controller, with each of said open and closed loop controllers communicating to gate drives for said inverter, and said open loop controller controlling said gate drives with sinusoidal commutation, and said closed loop controller controlling said gate drives with six step commutation;

a mode selector switch to switch between an open loop control position and a closed loop control position based upon a motor speed exceeding a predetermined level, an intermediate ground position provided on said mode selector switch, and said mode selector switch sitting in said intermediate ground position between said open loop position and said closed loop position;

said mode selector switch continues to monitor speed after having been moved to said closed loop position, and if said speed does not increase as expected after a predetermined period of time will move said switch back to said open loop position; and said open loop controller takes in an $I_q$ feedback quantity and compares it to an $I_q$ reference quantity to determine an error signal, and wherein said $I_q$ reference quantity is determined along a curve based upon the amount of time that said motor has been operating.

\* \* \* \* \*